US008863192B2

(12) United States Patent
Gao et al.

(10) Patent No.: US 8,863,192 B2
(45) Date of Patent: Oct. 14, 2014

(54) ADAPTIVE MONITORING METHOD FOR UPDATE DETECTION IN A MOBILE BROADCAST NETWORK

(75) Inventors: Qiang Gao, San Diego, CA (US); Qi Xue, San Diego, CA (US); Carlos Marcelo Pazos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 742 days.

(21) Appl. No.: 12/683,880

(22) Filed: Jan. 7, 2010

(65) Prior Publication Data
US 2011/0167455 A1 Jul. 7, 2011

(51) Int. Cl.
*H04N 5/445* (2011.01)
*H04L 12/18* (2006.01)
*H04H 40/18* (2008.01)
*H04H 60/25* (2008.01)
*H04H 60/73* (2008.01)
*H04W 72/00* (2009.01)

(52) U.S. Cl.
CPC ............ *H04L 12/1877* (2013.01); *H04H 40/18* (2013.01); *H04H 60/25* (2013.01); *H04H 60/73* (2013.01); *H04W 72/005* (2013.01); *Y02B 60/50* (2013.01)
USPC .................................. 725/50; 725/54; 725/62

(58) Field of Classification Search
USPC ............................ 725/14, 20, 62, 136, 37–61
See application file for complete search history.

(56) References Cited

U.S. PATENT DOCUMENTS

| 5,581,804 | A  | * | 12/1996 | Cameron et al. ........... 455/456.1 |
| 5,694,120 | A  | * | 12/1997 | Indekeu et al. .............. 340/7.23 |
| 6,246,336 | B1 |   | 6/2001  | Hymel |
| 6,256,336 | B1 | * | 7/2001  | Rademacher et al. ........ 375/140 |
| 2006/0020972 | A1 | * | 1/2006  | Regan et al. ..................... 725/46 |
| 2007/0276583 | A1 | * | 11/2007 | Dobeck et al. ................ 701/200 |
| 2009/0125413 | A1 | * | 5/2009  | Le Chevalier et al. .......... 705/26 |
| 2009/0172720 | A1 | * | 7/2009  | Kiiskinen et al. ................. 725/9 |
| 2011/0150431 | A1 | * | 6/2011  | Klappert ....................... 386/296 |

FOREIGN PATENT DOCUMENTS

| CN | 101090526 A | 12/2007 |
| CN | 101102547 A | 1/2008 |
| EP | 1180862 A1 | 2/2002 |
| JP | 2004537201 A | 12/2004 |

(Continued)

OTHER PUBLICATIONS

International Search Report and Written Opinion-PCT/US2011/020577-ISA/EPO-Apr. 21, 2011.

*Primary Examiner* — Pankaj Kumar
*Assistant Examiner* — Timothy Newlin
(74) *Attorney, Agent, or Firm* — The Marbury Law Group, PLLC

(57) ABSTRACT

Information included within metadata broadcast within an overhead flow of a mobile broadcast network enables receiver devices to determine when metadata updates will occur. The mobile broadcast network can include within metadata messages information related to a time for the next metadata update. Using this information, receiver devices can determine when the next metadata update will occur and de-energize the receiver until that time. Enabling mobile devices to remain de-energized until the next metadata update improves their power efficiency. Synchronizing mobile devices to access the overhead flow for updated metadata reduces the content delivery latency that the system must accommodate, thereby improving system flexibility and bandwidth efficiency. Specify the time of a next metadata update enables the broadcast system to change the rate and timing at which metadata updates are performed.

28 Claims, 9 Drawing Sheets

(56) References Cited

FOREIGN PATENT DOCUMENTS

| JP | 2006040259 A | 2/2006 |
| JP | 2006053633 A | 2/2006 |
| WO | WO2005101411 A2 | 10/2005 |

* cited by examiner

US 8,863,192 B2

ADAPTIVE MONITORING METHOD FOR UPDATE DETECTION IN A MOBILE BROADCAST NETWORK

FIELD OF THE INVENTION

The present invention relates generally to the operation of mobile broadcast networks, and more particularly to methods for scheduling and receiving updates to program content metadata.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. A recent addition to wireless communication services has been the ability to broadcast television and other content to mobile devices. Mobile television (TV) broadcast services allow users to view TV programming, as well as receive mobile editions of news, entertainment, sports, business, and other programming, using their cell phone or other wireless mobile device configured to receive the mobile broadcast transmissions.

SUMMARY

The various embodiments enable mobile devices to reduce the frequency of accessing content metadata in an overhead flow portion of mobile broadcast transmissions by informing mobile devices when metadata updates will occur. A time for a next metadata update may be determined by a server within a mobile TV broadcast network based upon the programs and content to be broadcast. Using this information, the server can include within metadata messages time information regarding when the next update of metadata will occur. Such time information may be an absolute time value or a relative time value. This metadata update time information may be included in each metadata message. Mobile devices receiving such metadata messages can determine when the next metadata update will occur and de-energize their receiver until that time. Including information regarding the time of the next metadata update in current metadata messages broadcast in the overhead flow enables mobile devices to conserve battery power by energizing their receiver only when needed to receive updated content metadata or to receive a desired program or content. Synchronizing mobile devices to access the overhead flow for updated metadata may reduce the amount of content delivery latency that the system must accommodate, thereby improving bandwidth efficiency. Permitting a mobile TV broadcast service provider to individually specify the time of each metadata update provides the broadcast system with flexibility for modifying or describing broadcast content.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
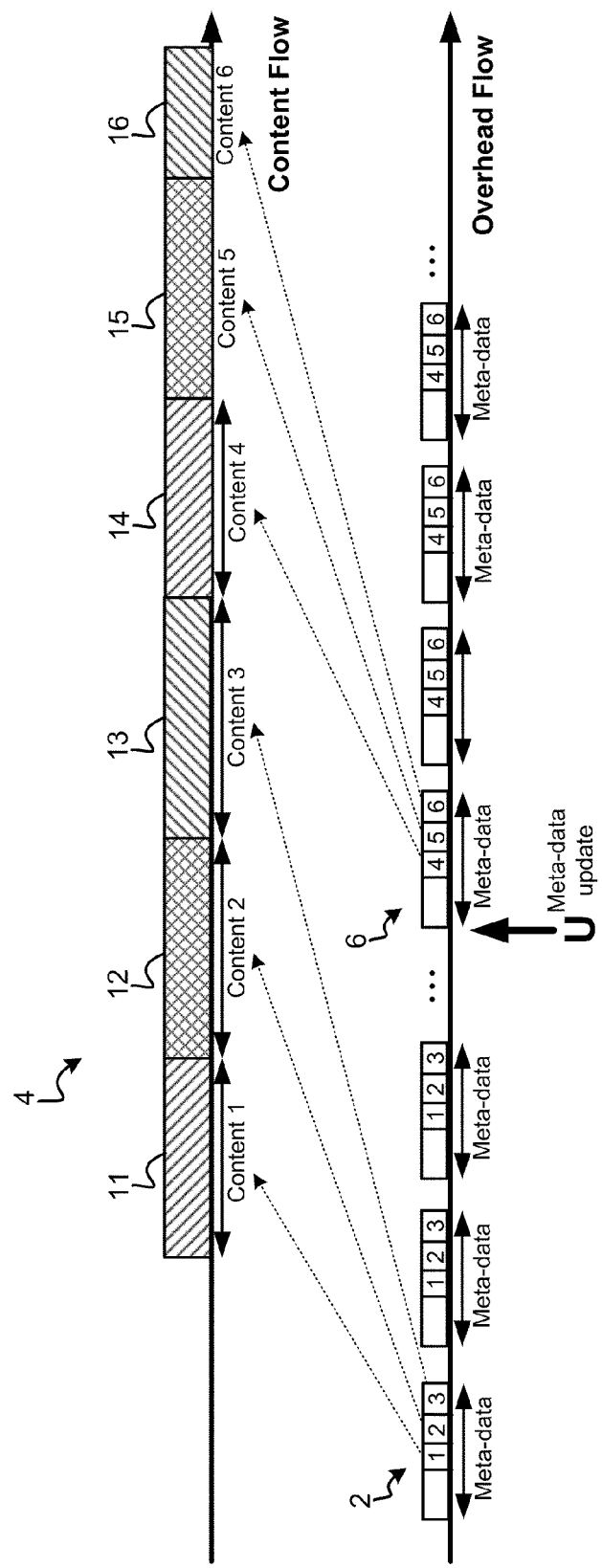
FIG. 1 is a communication flow schematic illustrating the relationship between content broadcast flows and overhead broadcast flows in a mobile TV broadcast system.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" refer to any one or all of cellular telephones, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory and mobile TV broadcast receiver circuitry for receiving and processing mobile TV broadcast transmissions.

The word "broadcast" is used herein to mean the transmission of data (information packets) so that it can be received by a large number of receiving devices simultaneously. Examples of a broadcast message are mobile television service broadcast signals, including content broadcasts (content flow) and overhead information broadcasts (overhead flow) such as metadata messages.

Mobile TV receiver devices are different from traditional television sets in that the receiver devices are portable. Consequently, mobile devices configured to receive mobile TV broadcast services must be self-contained and designed to operate for extended periods of time on battery power. The need to be battery powered presents unique challenges to the mobile TV broadcast system. Mobile TV broadcast networks broadcast information in formats that enable mobile devices to selectively tune-in to receive desired content and de-energize their broadcast receiver whenever the desired content is not being broadcast. As a result of the data transmission structure, mobile TV receiver devices typically activate their receiver circuitry for a small percentage of the time, thereby reducing the amount of power required to receive desired content. Further, information about programs and content are broadcast in advance so that mobile devices can determine just when to tune-in to receive a selected content.

Mobile TV broadcast services enable mobile devices to be self-contained by broadcasting information about the programs and content that will be broadcast in the future via a portion of broadcast transmissions dedicated to carrying overhead information (referred to herein as the "overhead flow") which is separate from the portion of the broadcast transmissions that carry the content (referred to herein as "content flow"). This information about the content information, or "metadata," enables mobile devices to discover how and when to receive selected content. Mobile devices can also process this metadata to provide users with an electronic viewing guide. Such an electronic viewing guide, which is known in some mobile TV formats as a "service guide" or "electronic service guide" (ESG), is a viewable program guide similar to that available on cable and satellite television systems. The electronic viewing guide provided on mobile TV broadcast networks enables users to see what programming and content is available, when and on what "channel." The electronic viewing guide may be presented in a graphical user interface format so that users can easily designate a program for viewing or content for download by selecting it within a display of future programs and content. In addition to identifying the start time and broadcast address for particular programs and content, the broadcast metadata may also include information regarding the nature of the content to be broadcast.

The broadcast metadata is transmitted in the overhead flow which is a low data rate portion of the mobile TV broadcast signal suitable for carrying overhead information like the program and content metadata. In contrast to the overhead flow, programs and content are broadcast via high data rate portions of the broadcast signal, which are collectively referred to herein as the "content flow."

A number of different mobile broadcast television services and broadcast standards are available or contemplated in the future, all of which may implement and benefit from the various embodiments. Such services and standards include Open Mobile Alliance Mobile Broadcast Services Enabler Suite (OMA BCAST), MediaFLO, Digital Video Broadcast IP Datacasting (DVB-IPDC), and China Multimedia Mobile Broadcasting (CMMB). While the broadcast formats and terminology very among the different mobile TV broadcast service standards, they all employ metadata transmissions to enable mobile devices to receive selected content and inform users of programs and content available for viewing or download. To avoid confusion regarding particular broadcast standards, the generic terms content flow, overhead flow, and metadata messages are used herein to describe the various embodiments.

Typically, mobile TV broadcast service providers receive a variety of different programs and content from different content sources and content providers. The mobile TV broadcast service provider typically stores content in a server, schedules broadcast windows for each content, and then broadcasts the content in batches. A broadcast window is a period of time in which a particular content is to be broadcast. To enable mobile devices to receive the content, the mobile TV broadcast service provider server will generate metadata messages for transmission via the overhead flow that inform mobile devices when each program or content will be transmitted and the broadcast address on which the transmission will be made. Mobile devices can use the information in the metadata messages to determine if any of the content has been selected by the user for reception or download and, if so, determine the time to tune-in to the broadcast transmissions and the network address on which to receive the selected content.

The interrelationships 4 between metadata broadcasted on the overhead flow and the content broadcasted on the content flow are illustrated in FIG. 1. Metadata may be formatted into metadata messages 2 which include information regarding the start time, broadcast address, nature of the content, and other information about the content which enables the mobile device to identify and receive selected content when it is broadcast. For example, as illustrated in FIG. 1, a metadata message 2 may include a plurality of metadata elements 1, 2, 3 that provide information about each of a plurality of programs or content 11, 12, 13 that will be broadcast at indicated times. Thus, a first metadata element 1 may provide information regarding a first content segment 11 that is being broadcast or will be broadcast in the future, such as its start time, broadcast address, title, subject matter, duration, parental rating, etc. Similarly, the second and third metadata elements 2, 3 may provide information regarding different programs or content 12, 13.

The types of information about the broadcast content that may be included within metadata are practically unlimited and may vary from system to system and content to content. Examples of metadata that may be transmitted in the overhead flow of a mobile TV broadcast service include the ESG provided in the DVB-IPDC standard and the Service Guide (SG) provided in the OMA BCAST standard. However, more information than what is included in the ESG or SG may be included in broadcasted metadata in order to provide mobile devices and users with more information about the content that is or will be broadcast.

Providing more information about the information in the available content enables users and mobile devices to make more intelligent selections of content for viewing or download. This in turn enables mobile TV broadcast services to distribute a wide variety of content in addition to television programming. For example, broadcast content may include Internet webpages (e.g., webpages available at a particular URL, like www.cnn.com), tabulated data (e.g., stock quotes, sports scores, schedules, directories, etc.), images, video clips, audio recordings (e.g., music for download or streaming), etc. To enable users to select particular content from such a variety of content sources, the metadata may include specific details about the content on which the mobile device can index or search.

In order to be useful, the metadata should be received by the mobile device sufficiently in advance of the content broadcast time so that the mobile device can identify desired content (i.e., content containing information identified by a user as being of interest) and tune-in at the right time and to the correct address to receive the desired content broadcast. Thus, the mobile TV broadcast service provider server may format and transmit the metadata messages some time period before the content is scheduled for broadcast. This timing relationship between metadata messages and broadcast content is illustrated in FIG. 1 by the dashed arrows. Since mobile devices may be turned on at any time, the metadata messages are broadcasted repeatedly on a regular basis, such as every one to two seconds, as illustrated in FIG. 1. Thus, when a mobile device is turned on, it only needs to wait for the next transmission of the metadata message 2 to receive information about the current and upcoming broadcast content. Then, since the metadata messages are repeated, there is no need for the mobile device to monitor the overhead flow continuously once one metadata message has been received.

From time to time, mobile TV broadcast service providers will change their scheduled content requiring an update to the metadata messages. An update may be required when a new type of content or new information about a particular content becomes available. For example, mobile TV broadcast service providers may need to update metadata concerning program schedules when scheduled delays or changes are necessary, such as when a sporting event program runs into overtime. Another example would be when broadcast content includes webpages that are updated periodically, such as news webpages (e.g., www.cnn.com). Yet another example of content requiring periodic updates to metadata are programs or content that are broadcast in response to audience input, such as content selected based on audience requests or content modified based on audience participation.

To be useful, metadata updates should be accomplished in advance of changes to the broadcast content. This is illustrated in FIG. 1 which shows a metadata update U occurring before the new content 14, 15, 16 addressed in the new metadata message 6 is broadcast.

Figure 2:
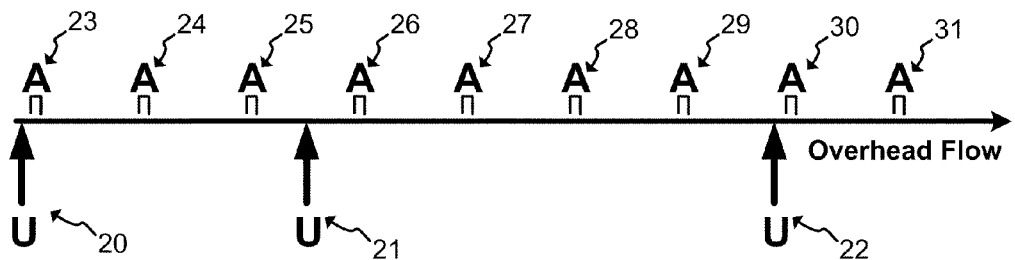
FIG. 2 is a communication flow schematic illustrating how mobile devices have previously received periodic metadata updates.

In order to conserve battery life, mobile devices which receive mobile TV broadcast services are configured to minimize the time that the broadcast receiver circuitry is energized. Thus, mobile devices only energize their receiver circuitry to receive content flow when selected content batches are being broadcast. Again, the mobile devices use scheduling information in the metadata messages to determine when to energize their receiver circuitry. Mobile devices may also be configured to conserve energy by monitoring the overhead flow periodically since the metadata changes relatively infrequently. This is illustrated in FIG. 2 which shows a timeline of the overhead flow including times when a mobile device accesses (A) metadata messages and when updates (U) to metadata messages occur. In order to conserve battery power, a mobile device may energize the mobile broadcast receiver for short periods to receive one or two metadata messages transmitted in the overhead flow. As discussed above with reference to FIG. 1, the metadata messages are repeated frequently, such as every one to two seconds, so a mobile device need only access a single metadata message, such as at access 23, to obtain the information required to monitor the broadcast service. A mobile device need only receive the metadata to determine if the broadcast contents are of interest to the user based upon user inputs. Since the metadata is much smaller than the broadcast contents, accessing the metadata messages in the overhead flow to determine if any content is of interest helps to minimize the power consumption of mobile devices.

Once a metadata message is obtained, the receiver may be de-energized since there is no value in continuing to receive the same information. However, mobile TV broadcast service providers will periodically update the metadata messages to reflect changes in the broadcast content, such as at update U events 20, 21, 22. Presently, mobile devices do not know when the next update of metadata will occur, so mobile devices must access the overhead flow periodically as illustrated in accesses 23-31.

While the conventional operating mode illustrated in FIG. 2 enables the receiver to remain de-energized for the majority of time, mobile devices are nevertheless wasting energy accessing the overhead flow at time when there is no new information to be obtained. For example, accesses 24, 25, 27, 28, 29 and 31 are unnecessary since the information in the overhead flow has already been obtained in a prior access (i.e., in accesses 23, 26 and 30). These unnecessary accesses 24, 25, 27, 28, 29 and 31 are performed to determine if the metadata has been updated. Thus, current methods for accessing metadata in the mobile TV broadcast services require mobile devices to operate in an inefficient manner.

Figure 3:
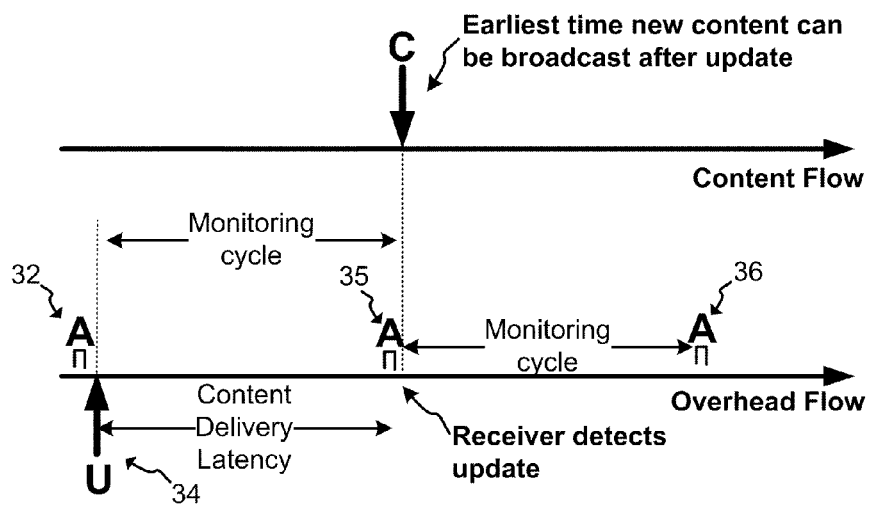
FIG. 3 is a communication flow schematic illustrating how conventional methods for receiving metadata updates in a mobile TV broadcast system determine a content delivery latency factor.

One method for reducing the amount of energy expended by mobile devices accessing metadata in the overhead flow might be to reduce the periodicity of such accesses (i.e., to energize the receivers less often). However, this approach is undesirable because of the impact the longer monitoring cycle has on broadcast system flexibility. This drawback is illustrated in FIG. 3 which shows overhead flow and content flow including times when a mobile device may access (A) metadata messages, a metadata message update (U) and broadcast time for a content (C) reflected in the metadata update. In order to ensure that mobile devices receive a metadata update 34 before the corresponding content is broadcast (point C on the timeline), the mobile TV broadcast network must provide sufficient time for all mobile devices to receive the update in their periodic overhead flow accesses 32, 35, 36. If a mobile device accesses the overhead flow just prior to an update of the metadata messages, such as at access 32 which falls just prior to update 34, the mobile device will not receive the updated metadata until its next periodic access, such as at access 35. Thus, in order to ensure all mobile devices receive an update before new content is broadcast, the system must wait a full monitoring cycle (i.e., the period between mobile device accesses of the overhead flow). As a result, a content delivery latency factor must be included within the system, which limits the broadcast system flexibility and responsiveness. Thus, if content is changing rapidly, as may occur when the content is a webpage reflecting frequently changing information (e.g., stock quotes, sports scores or news summaries), the content delivery latency dictated by the mobile device overhead flow access periodicity may limit the ability of the network to keep the metadata current with the content.

FIGS. 2 and 3 also illustrate that the goals of increasing broadcast network flexibility and extending mobile device battery life are at odds with one another. Decreasing the frequency at which mobile devices access the overhead flow in order to conserve battery power will necessarily extend the content delivery latency factor, and thus reduce broadcast network flexibility and responsiveness. On the other hand, increasing the frequency of mobile device overhead flow accesses to reduce content delivery latency will significantly increase mobile device battery consumption. Thus, current mobile TV broadcast services represent a compromise between extending battery life and increasing broadcast flexibility.

Another potential method for extending battery life involves performing metadata updates at particular times of day. This approach of prescheduling metadata updates would enable all mobile devices to energize their receivers to access the overhead flow at predetermined times and avoid energizing their receivers unnecessarily. However, this approach significantly impacts broadcast network flexibility since it precludes performing metadata updates at any rate other than that specified in the predetermined schedule. Thus, such a broadcast network system could not react to current events or network conditions by increasing the frequency of metadata updates.

The various embodiments improve mobile device battery life by reducing the number of times the mobile devices must access metadata in the overhead flow metadata by informing mobile devices when metadata updates will take place. Since a mobile TV broadcast service provider server knows from its scheduling functionality when a current content batch will end and the earliest time that the next content batch will broadcast, the server can determine an appropriate time to update the metadata in the overhead flow. Using this information, the server can include within metadata messages information regarding the time at which the next update of metadata will take place. This information regarding the next metadata update time may be an absolute value (i.e., a time of day) or a relative value (e.g., a time period after a known time or event). This metadata update schedule information can be included in the current metadata messages. Doing so enables mobile devices to determine when the next metadata update will occur and to leave their receivers de-energized until that time. When a mobile device is turned on it will typically immediately access the overhead flow to obtain the current metadata. That access of the current metadata will inform it of the current broadcast content and the time of the next metadata update. Enabling mobile devices to remain de-energized until the next metadata update extends the battery life of mobile devices, and thus may enhance the user experience. Synchronizing all mobile devices so they may access the overhead flow to receive updated metadata reduces the amount of content delivery latency that the broadcast system must accommodate, thereby improving system flexibility and bandwidth efficiency. Permitting the mobile TV broadcast service provider server to specify the time of the next metadata update in current metadata broadcasts enables the broadcast system to change the rate and timing at which metadata updates are performed.

Figure 4:
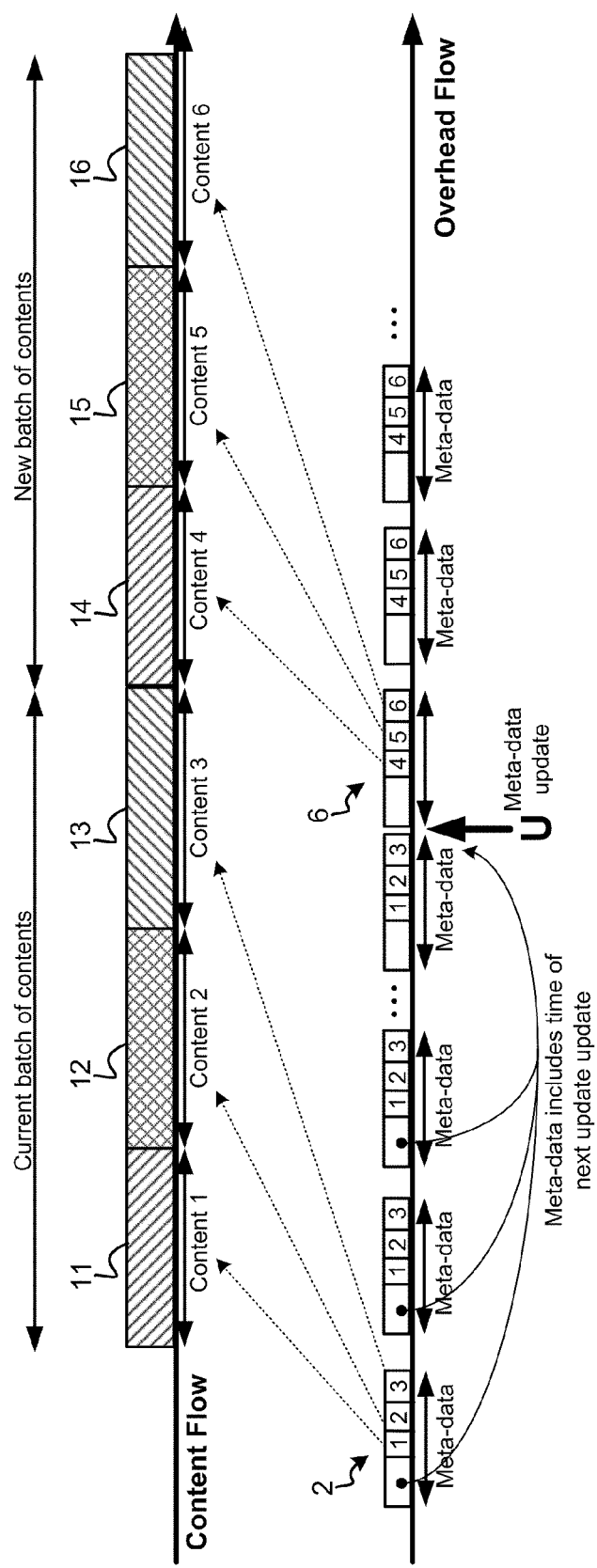
FIG. 4 is a communication flow schematic illustrating the relationship between content flow broadcasts and overhead flow broadcasts according to an embodiment.

FIG. 4 illustrates how by including a time for the next metadata update within each metadata message 2 receiving devices can determine when they should energize their receivers in order to receive the next updated metadata message 6. Thus, the metadata messages 2 include metadata regarding the contents in the current broadcast batch, as well as timing information regarding when the next metadata update will occur.

Figure 5:
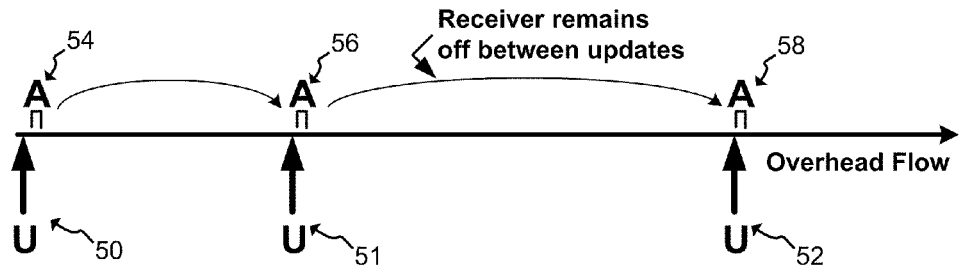
FIG. 5 is a communication flow schematic illustrating how mobile devices receive periodic metadata updates according to an embodiment.

The energy efficiency advantages of the various embodiments are illustrated in FIG. 5 which shows an overhead flow timeline including metadata update U events 50, 51, 52 and mobile device accesses of the overhead flow 54, 56, 58. As illustrated, mobile devices only need to energize their receivers when updated metadata is being transmitted, such as at or just after the metadata updates 50, 51, 52.

Figure 6:
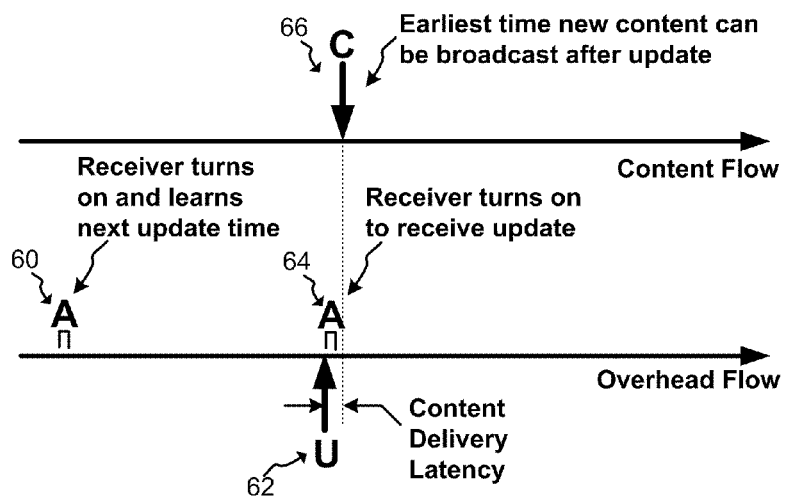
FIG. 6 is a communication flow schematic illustrating how embodiment methods for receiving metadata updates in a mobile TV broadcast system may reduce the content delivery latency factor.

Improvements in broadcast flexibility and bandwidth utilization are illustrated in FIG. 6 which shows a content flow and overhead flow timeline including a metadata update 62, mobile device accesses of the overhead flow 60, 64 and a new content broadcast 66. When a mobile device receiver is first energized it typically immediately accesses the overhead flow (e.g., access 60) thereby obtaining the current metadata and the time of the next metadata update. Using the time information in the current metadata message, a mobile device can determine when to energize its receiver so it can receive the next metadata update 62, as illustrated in access 64. Since the mobile device accesses the overhead flow at or just after the metadata update 62, the earliest time C that new content reflected in that metadata update can be broadcast (i.e., point 66) is soon after the metadata update 62. Thus, the minimum content delivery latency may be reduced by the various embodiments. The necessary content delivery latency thus may be reduced to the amount of time that mobile devices may require to access and process a metadata message, determine if a desired content is about to be broadcast, and begin receiving that desired content. Thus, the various embodiments may enable reducing system content delivery latency to systematic minimums.

Figure 7:
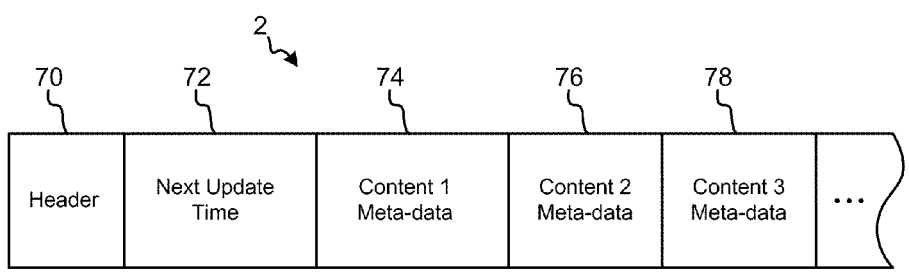
FIG. 7 is a message structure diagram of an embodiment metadata message.

FIG. 7 illustrates a metadata message 2 showing an example of how the next update time may be included within the message metadata. A metadata message 2 may include a header portion 70 including signal patterns that enable mobile devices to recognize the start of a metadata message. A metadata message 2 may include a variety of metadata message elements 72, 74, 76, 78, one of which may be used to include information regarding the next metadata update time, such as metadata element 72. Other metadata elements 74, 76, 78 may be dedicated to providing metadata regarding particular content in the current content batch.

Information regarding the next metadata update 72 may be in the form of an absolute time value (e.g., local time or Greenwich Mean Time), or a relative time value (e.g., X. minutes after the last update or Y seconds before the end of a current content broadcast). For example, a mobile TV broadcast service provider server may determine the time of day at which the next content patch will be broadcast, schedule the next metadata update for a few seconds before that time of day, and insert that time value in a suitable format into the current metadata message. The current metadata message is then repeatedly broadcasted until the new (i.e., updated) metadata message is broadcast. Alternatively, the metadata message may include a relative time reference sufficient to enable mobile device to determine the time of the next update based on information known to it. Since the current metadata may include information regarding content broadcasts, the time of the next metadata update may be in the form of a period or span of time after or before a time specified in the content metadata. For example, if the content metadata includes the end time of a particular program or content, the next metadata update may be specified in terms of a relative time value before or after the end of a scheduled content broadcast.

In order to enable all mobile devices to energize their receivers in time to access an updated metadata broadcast, mobile devices may need to have their internal clocks synchronized with those of the broadcast network. Typically, mobile communication networks utilize a variety of methods for synchronizing transmitters and receivers, any of which may be utilized for synchronizing the internal clocks of mobile devices with the timing of metadata updates. For example, mobile devices may include a Global Positioning System receiver which can provide an accurate time signal that is the same for all mobile devices and the broadcast network. As another example, the broadcast network may periodically transmit time synchronization signals to enable all mobile devices to synchronize their internal clocks with those of the broadcast network.

Figure 8:
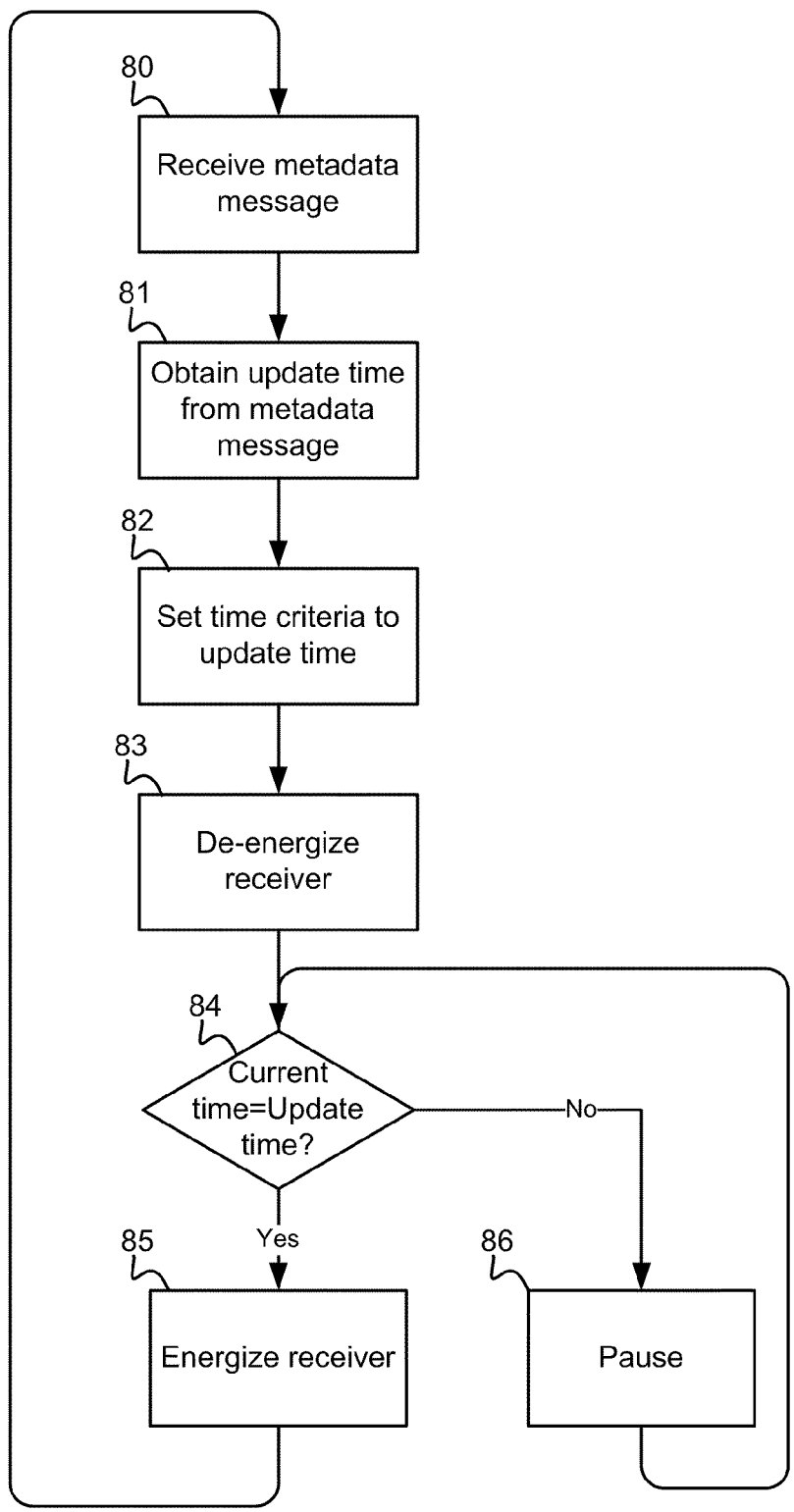
FIG. 8 is a process flow diagram of an embodiment method for accessing metadata updates in a mobile TV broadcast system.

An example embodiment method by which a mobile device may use information regarding time of the next metadata update is illustrated in FIG. 8. When a mobile device is first activated a processor within the device may energize its receiver to access the overhead flow and receive the current metadata message, step 80. The mobile device processor may parse the received metadata message to obtain information regarding timing of the next metadata update, step 81. This information may then be used to set a time criteria or alarm that the mobile device processor can use to determine when to re-energize the receiver, step 82. The mobile device processor may de-energize the receiver if it determines that none of the currently broadcast content is of interest to the user, step 83. The mobile device processor may periodically compare the current time to the set time for the next update to determine if they are the same, determination 84. If the current time does not equal the time for the next metadata update (i.e., determination 84="No"), the mobile device processor may pause for a predetermined amount of time, step 86, before testing the current time again. When the current time equals the time for the next metadata update (i.e., determination 84="Yes"), the mobile device processor may energize the receiver, step 85, thereby enabling it to receive the updated metadata message, returning to step 80.

Figure 9:
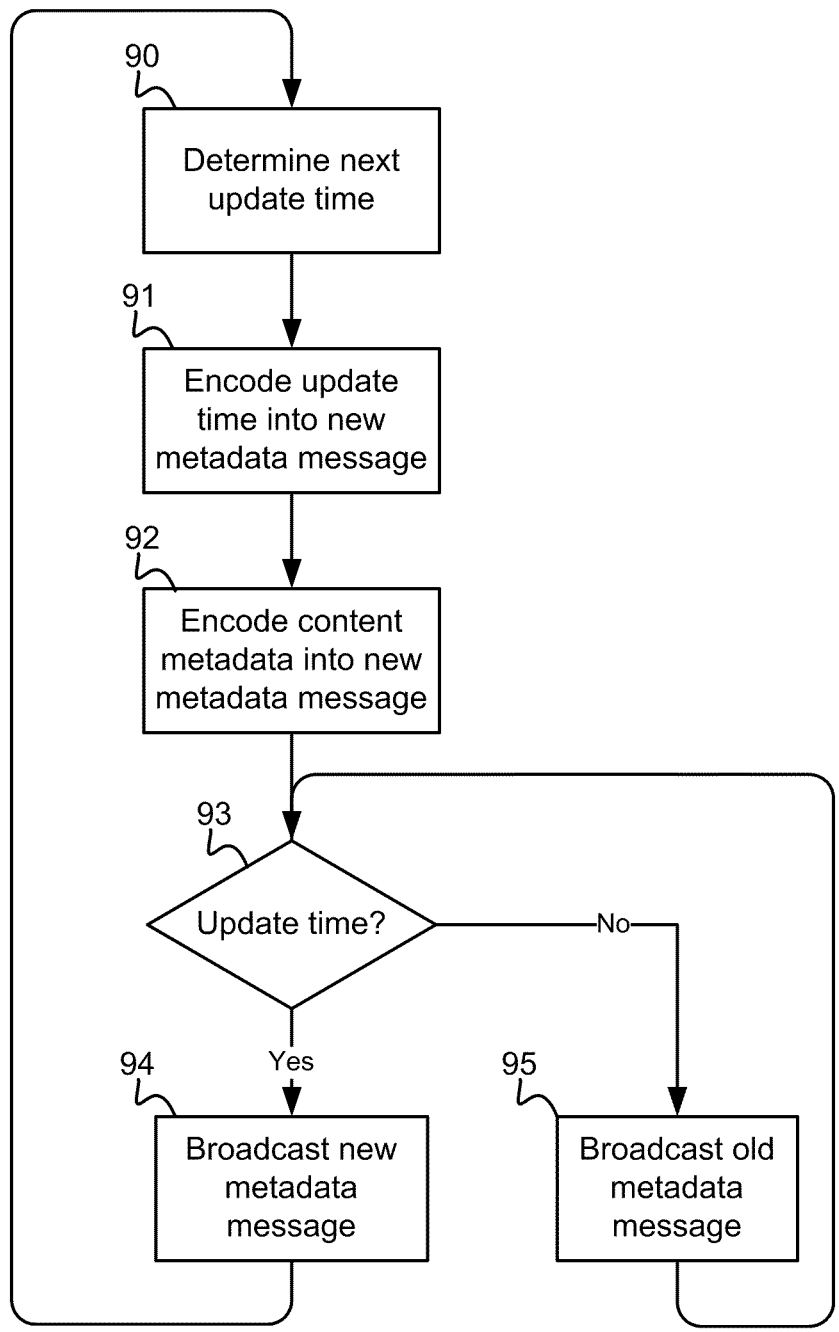
FIG. 9 is a process flow diagram of an embodiment method for generating metadata messages in a mobile TV broadcast system.

An example embodiment method by which a server within a mobile TV broadcast network can include information regarding timing of the next metadata update within current metadata messages is illustrated in FIG. 9. Knowing the schedule of content being broadcast in the current batch and scheduled for the next batch, the server can determine the appropriate time for broadcasting the next metadata update, step 90. The server may then encode information regarding that update time into a new metadata message, step 91. The time information may be in the form of an absolute time value or a relative time value. The server may also encode into the new metadata message the content metadata associated with the next content broadcast patch, step 92. With the new (i.e., updated) metadata message ready for transmission, the server may determine whether the current time is the same as the time specified for updating the metadata included in the current metadata message (i.e., the metadata message currently being broadcast over the overhead flow), determination 93. If it is not yet time to update the metadata message (i.e., determination 93="No"), the server may continue to broadcast the current metadata message over the overhead flow, step 95. When the server determines that it is time to update the metadata message (i.e., determination 93="Yes"), the server may send the new metadata message to the broadcast network for broadcast over the overhead flow, step 94. The server then may return to step 90 to determine the time for the next metadata update and repeat the processes described above.

Figure 10:
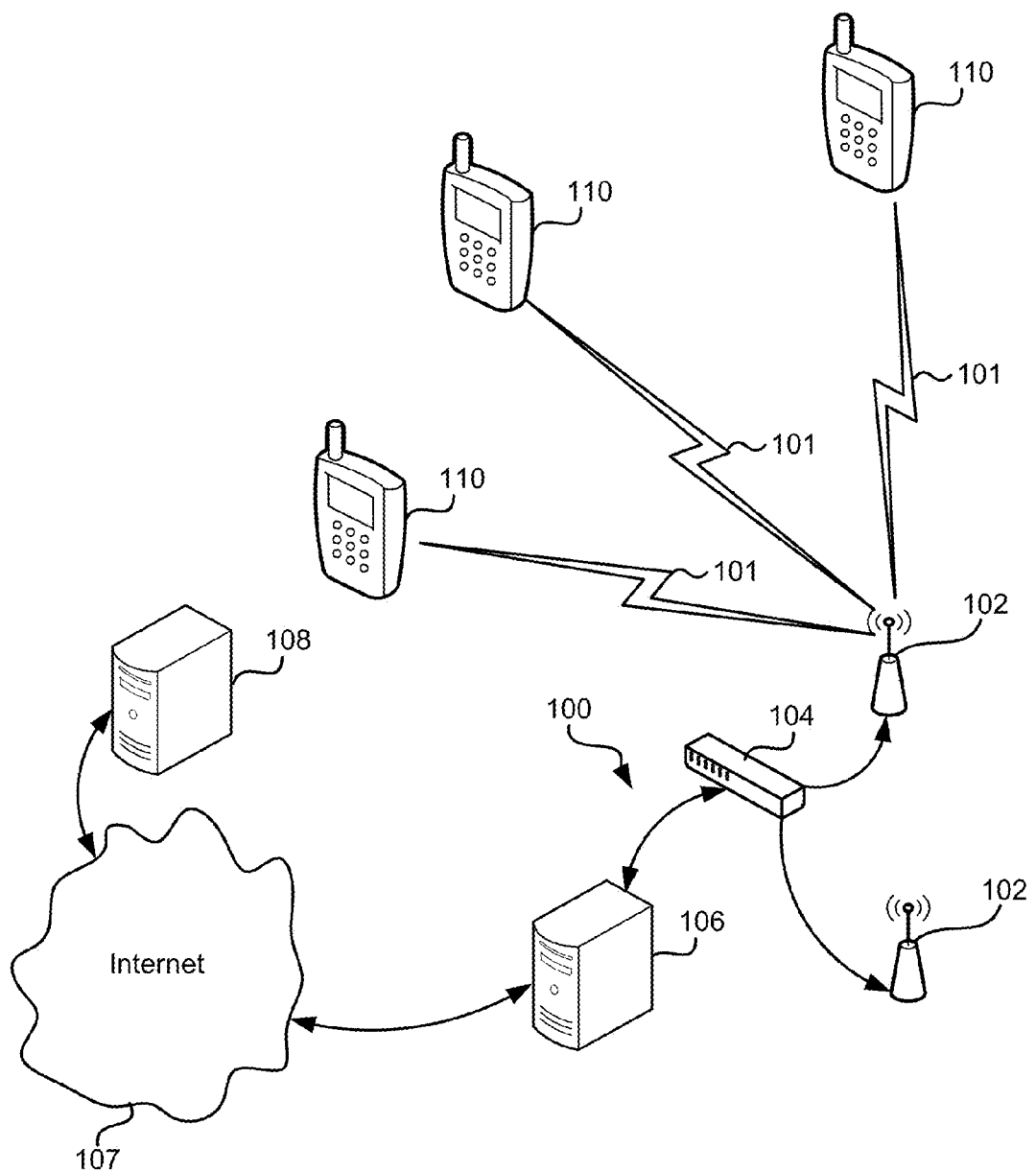
FIG. 10 is a communication system block diagram illustrating a mobile TV broadcast communication system suitable for use in an embodiment.

Example components of a typical mobile TV broadcast system are illustrated in FIG. 10. A mobile TV broadcast network 100 typically includes a plurality of broadcast transmitters 102 controlled by a mobile broadcast network control center 104. The mobile TV broadcast network 100 broadcasts content from the broadcast transmitters 102 as mobile broadcast transmissions 101 for reception by mobile devices 110. Within the mobile broadcast network control center 104 will typically be one or more servers 106 which may be configured to manage the scheduling of content broadcasts, generation of electronic service guides and other metadata regarding the content broadcasts, and generation of metadata messages for broadcast via the overhead flow of the mobile TV broadcast network 100. One or more servers 106 may also include connections to an external network, such as the Internet 107, through which the server 106 may receive content feeds from content provider servers 108. One or more servers 106 may be configured according to the various embodiments to receive content from content provider servers 108, determine information about the received content to be included in metadata, determine a schedule for broadcast of the content in content batches, generate metadata messages including metadata regarding the content (including broadcast times), determine a time for a next update of the metadata, include information regarding the time for the next metadata update in the metadata messages, and provide the metadata messages to the mobile TV broadcast network 100 for broadcast to mobile devices 110.

Figure 11:
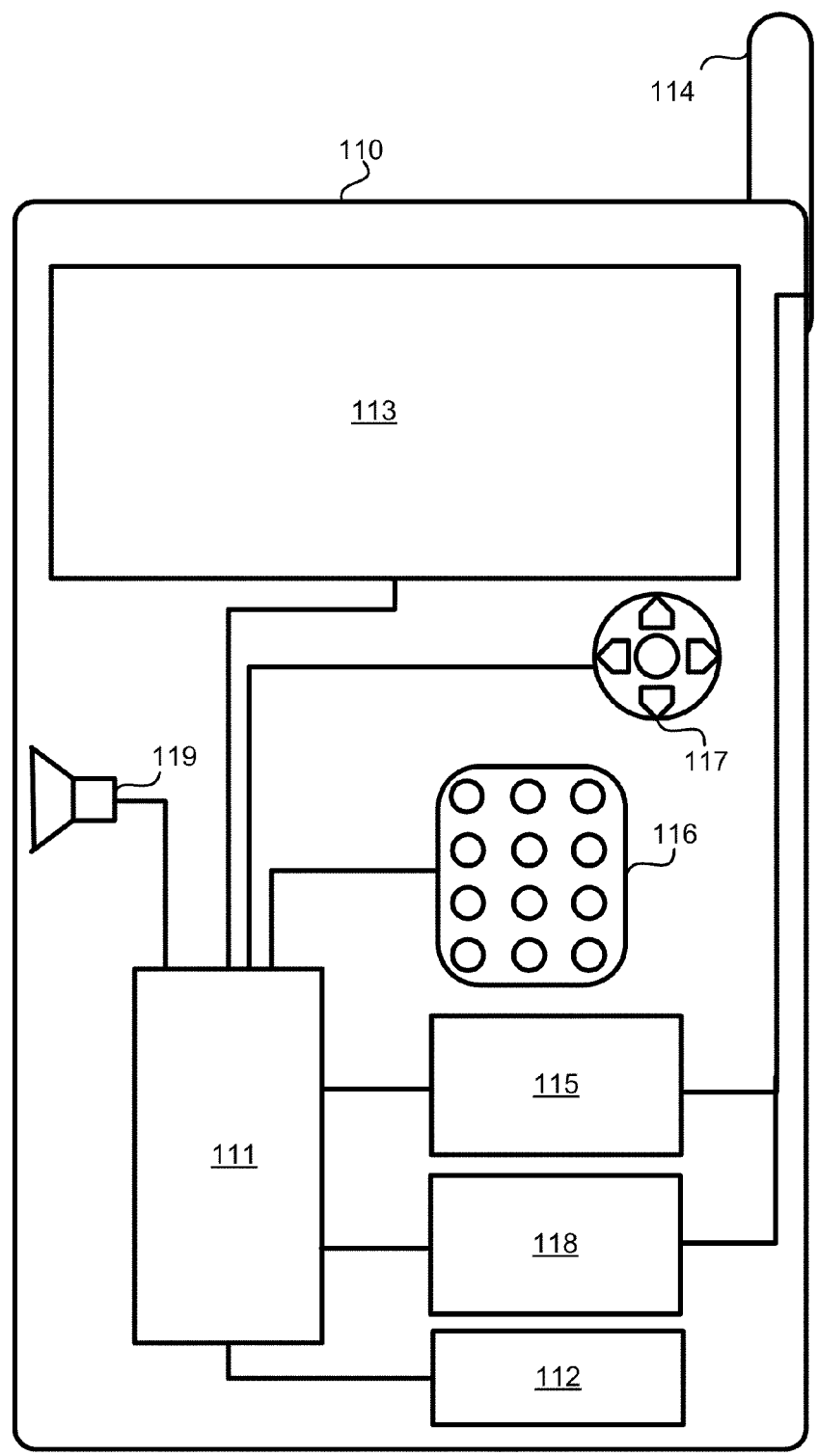
FIG. 11 is a component block diagram of a mobile device suitable for use in an embodiment.

Typical mobile devices 110 suitable for use with the various embodiments will have in common the components illustrated in FIG. 11. For example, an exemplary mobile device 110 may include a processor 111 coupled to internal memory 112, a display 113, and to a speaker 119. Additionally, the mobile device 110 may have an antenna 114 for sending and receiving electromagnetic radiation that is connected to a wireless data link and/or cellular telephone transceiver 115 coupled to the processor 111 and a mobile TV broadcast receiver 118 coupled to the processor 111. Mobile devices typically also include a key pad 116 or miniature keyboard and menu selection buttons or rocker switches 117 for receiving user inputs.

The processor 111 may be any programmable microprocessor, microcomputer or multiple processor chip or chips that can be configured by software instructions (applications) to perform a variety of functions, including the functions of the various embodiments described herein. In some mobile devices, multiple processors 111 may be provided, such as one processor dedicated to wireless communication functions and one processor dedicated to running other applications. Typically, software applications may be stored in the internal memory 112 before they are accessed and loaded into the processor 111. In some mobile devices, the processor 111 may include internal memory sufficient to store the application software instructions. In some mobile devices, the secure memory may be in a separate memory chip coupled to the processor 111. In many mobile devices 110, the internal memory 112 may be a volatile or nonvolatile memory, such as flash memory, or a mixture of both. For the purposes of this description, a general reference to memory refers to all memory accessible by the processor 111, including internal memory 112, removable memory plugged into the mobile device, and memory within the processor 111 itself.

Figure 12:
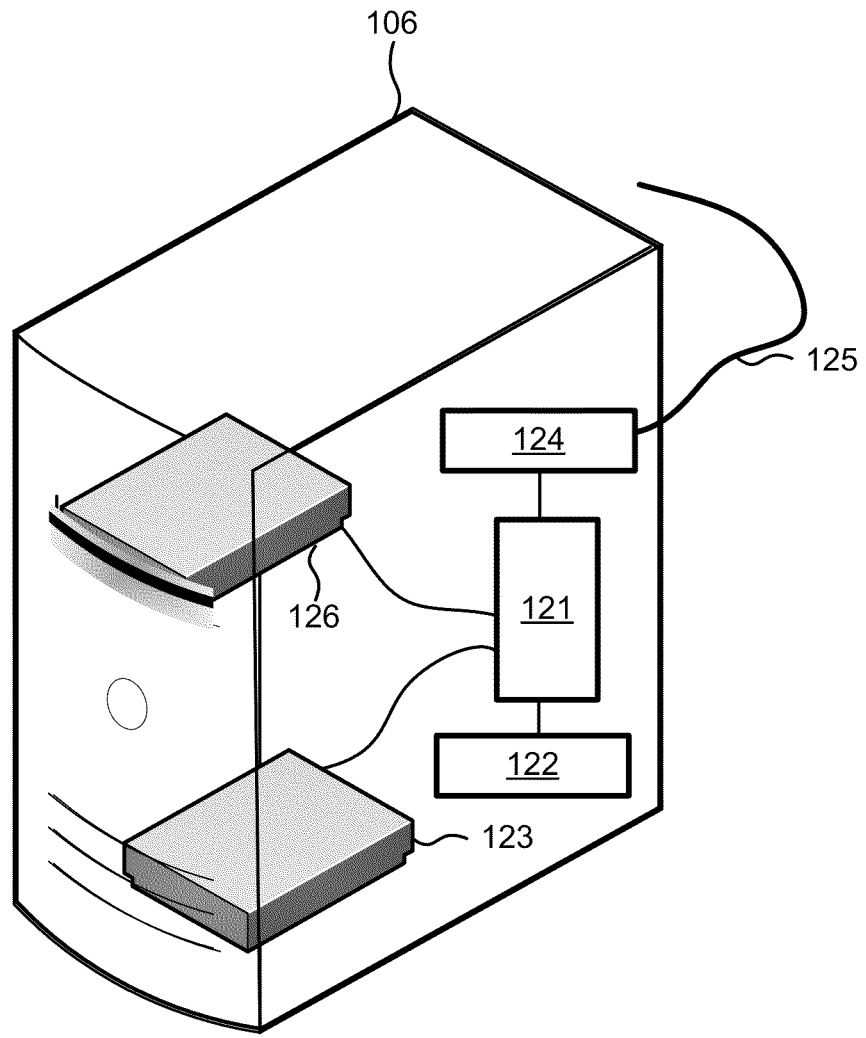
FIG. 12 is a component block diagram of a server device suitable for use in an embodiment.

A number of the embodiments described above may also be implemented with any of a variety of remote server devices, such as the server 106 illustrated in FIG. 12. Such a server 106 typically includes a processor 121 coupled to volatile memory 122 and a large capacity nonvolatile memory, such as a disk drive 123. The server 106 may also include a floppy disc drive and/or a compact disc (CD) drive 126 coupled to the processor 121. The server 106 may also include network access ports 124 coupled to the processor 121 for establishing data connections with network circuits 125, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium, i.e., non-transitory computer-readable or processor-readable medium. The steps of a method or algorithm disclosed herein may be embodied in a processor-executable software module executed which may reside on a non-transitory computer-readable or processor-readable medium. Non-transitory computer-readable or processor-readable media includes computer storage media that facilitates transfer of a computer program from one place to another. A storage media may be any available media that may be accessed by a computer. By way of example, and not limitation, such non-transitory computer-readable or processor-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable or processor-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for updating metadata concerning broadcast content in a mobile broadcast system, comprising:
   determining a time for a next update of metadata containing information about upcoming broadcast content within a content flow portion of a mobile broadcast transmission;
   including information regarding the determined time for the next update of the metadata within a current metadata message within an overhead portion of a first mobile broadcast transmission; and
   broadcasting an updated metadata message within an overhead portion of a subsequent mobile broadcast transmission when a current time equals the determined time for the next update of the metadata based on the information included within the current metadata message within the overhead portion of the first mobile broadcast transmission.

2. The method of claim 1, further comprising:
   receiving the current metadata message from the overhead portion of the first mobile broadcast transmission;
   obtaining the information regarding the time for the next update of the metadata from the received current metadata message;
   determining the time for the next update of the metadata from the information regarding the time for the next update of the metadata obtained from the received current metadata message;
   de-energizing a broadcast receiver;
   determining if a current time equals the time for the next update of the metadata;
   energizing the broadcast receiver when the current time equals the time for the next update of the metadata; and
   receiving the updated metadata message from the overhead portion of the subsequent mobile broadcast transmission.

3. The method of claim 2, wherein:
   the information regarding the time for the next update of the metadata comprises an absolute time value; and
   determining the time for the next update of the metadata from the information regarding the time for the next update of the metadata obtained from the received current metadata message comprises interpreting the absolute time value as a time of day at which to energize a transceiver.

4. The method of claim 2, wherein:
   the information regarding the time for the next update of the metadata comprises a relative time value; and
   determining the time for the next update of the metadata from the information regarding the time for the next update of the metadata obtained from the received current metadata message comprises adding the relative time value to a known time value to obtain a time of day for the next update of the metadata.

5. A mobile broadcast system, comprising:
   a mobile broadcast network comprising:
   a broadcast network server configured with server processor-executable instructions to perform operations comprising:
       determining a time for a next update of metadata containing information about upcoming broadcast content within a content flow portion of a mobile broadcast transmission;

including information regarding the determined time for the next update of the metadata within a current metadata message within an overhead portion of a first mobile broadcast transmission; and broadcasting an updated metadata message within an overhead portion of a subsequent mobile broadcast transmission when a current time equals the determined time for the next update of the metadata based on the information included within the current metadata message within the overhead portion of the first mobile broadcast transmission; and a mobile device comprising:

a mobile device processor, and a broadcast receiver coupled to the processor and configured to receive communications from the mobile broadcast network, wherein the mobile device processor is configured with processor-executable instructions to perform operations comprising:

receiving via the broadcast receiver the current metadata message from the overhead portion of the first mobile broadcast transmission;

obtaining the information regarding the time for the next update of the metadata from the received current metadata message;

determining the time for the next update of the metadata from the information regarding the time for the next update of the metadata obtained from the received current metadata message;

de-energizing the broadcast receiver;

determining if a current time equals the time for the next update of the metadata;

energizing the broadcast receiver when the current time equals the time for the next update of the metadata; and receiving via the broadcast receiver the updated metadata message from the overhead portion of the subsequent mobile broadcast transmission, wherein the updated metadata message contains updated information about upcoming broadcast content within a content flow portion of a mobile broadcast transmission.

6. The mobile broadcast system of claim 5, wherein:

the information regarding the time for the next update of the metadata comprises an absolute time value; and the mobile device processor is configured with processor-executable instructions such that determining the time for the next update of the metadata from the information regarding the time for the next update of the metadata obtained from the received current metadata message comprises interpreting the absolute time value as a time of day at which to energize a transceiver.

7. The mobile broadcast system of claim 5, wherein:

the information regarding the time for the next update of the metadata comprises a relative time value; and the mobile device processor is configured with processor-executable instructions such that determining the time for the next update of the metadata from the information regarding the time for the next update of the metadata obtained from the received current metadata message comprises adding the relative time value to a known time value to obtain a time of day for the next update of the metadata.

8. A mobile device configured to receive mobile broadcast services, comprising:

a processor;

a broadcast receiver coupled to the processor, the broadcast receiver configured to receive mobile broadcast transmissions from a mobile broadcast service provider, wherein the processor is configured with processor-executable instructions to perform operations comprising:

receiving via the broadcast receiver a current metadata message from an overhead portion of the mobile broadcast transmissions, wherein the current metadata message contains information about upcoming broadcast content within a content flow portion of a mobile broadcast transmission;

obtaining information regarding a time for a next update of metadata from the received current metadata message from the overhead portion of the mobile broadcast transmissions;

determining the time for the next update of the metadata from the information regarding the time for the next update of the metadata obtained from the received current metadata message;

de-energizing the broadcast receiver;

determining if a current time equals the time for the next update of the metadata based on the information obtained from the received current metadata message from the overhead portion of the mobile broadcast transmissions;

energizing the broadcast receiver when the current time equals the time for the next update of the metadata; and receiving an updated metadata message from an overhead portion of subsequent mobile broadcast transmissions, wherein the updated metadata message contains updated information about upcoming broadcast content within a content flow portion of a mobile broadcast transmission.

9. The mobile device of claim 8, wherein:

the information regarding the time for the next update of the metadata comprises an absolute time value; and the processor is configured with processor-executable instructions such that determining the time for the next update of the metadata from the information regarding the time for the next update of the metadata obtained from the received current metadata message comprises interpreting the absolute time value as a time of day at which to energize a transceiver.

10. The mobile device of claim 8, wherein:

the information regarding the time for the next update of the metadata comprises a relative time value; and the processor is configured with processor-executable instructions such that determining the time for the next update of the metadata from the information regarding the time for the next update of the metadata obtained from the received current metadata message comprises adding the relative time value to a known time value to obtain a time of day for the next update of the metadata.

11. A server within a mobile TV broadcast system, the server comprising:

a server processor coupled to a mobile broadcast network, the server processor configured with processor-executable instructions to perform operations comprising:

determining a time for a next update of metadata containing information about upcoming broadcast content within a content flow portion of a mobile broadcast transmission;

including information regarding the determined time for the next update of the metadata within a current metadata message within an overhead portion of a first mobile broadcast transmission; and broadcasting an updated metadata message within an overhead portion of a subsequent mobile broadcast transmission when a current time equals the determined time for the next update of the metadata based on the information included within the current metadata message within the overhead portion of the first mobile broadcast transmission.

12. The server of claim 11, wherein the information regarding the time for the next update of the metadata comprises an absolute time value.

13. The server of claim 11, wherein the information regarding the time for the next update of the metadata comprises a relative time value.

14. A mobile communication network, comprising:
means for determining a time for a next update of metadata containing information about upcoming broadcast content within a content flow portion of a mobile broadcast transmission;
means for including information regarding the determined time for the next update of the metadata within a current metadata message within an overhead portion of a first mobile broadcast transmission; and
means for broadcasting an updated metadata message within an overhead portion of a subsequent mobile broadcast transmission when a current time equals the determined time for the next update of the metadata based on the information included within the current metadata message within the overhead portion of the first mobile broadcast transmission;
means for receiving the current metadata message from the overhead portion of the first mobile broadcast transmission;
means for obtaining the information regarding the time for the next update of the metadata from the received current metadata message;
means for determining the time for the next update of the metadata from the information regarding the time for the next update of the metadata obtained from the received current metadata message;
means for de-energizing a mobile broadcast receiver;
means for determining if a current time equals the time for the next update of the metadata;
means for energizing the mobile broadcast receiver when the current time equals the time for the next update of the metadata; and
means for receiving the updated metadata message from the overhead portion of the subsequent mobile broadcast transmission, wherein the updated metadata message contains updated information about upcoming broadcast content within a content flow portion of a mobile broadcast transmission.

15. The mobile communication network of claim 14, wherein:
the information regarding the time for the next update of the metadata comprises an absolute time value; and
means for determining the time for the next update of the metadata from the information regarding the time for the next update of the metadata obtained from the received current metadata message comprises means for interpreting the absolute time value as a time of day at which to energize a transceiver.

16. The mobile communication network of claim 14, wherein:
the information regarding the time for the next update of the metadata comprises a relative time value; and
means for determining the time for the next update of the metadata from the information regarding the time for the next update of the metadata obtained from the received current metadata message comprises means for adding the relative time value to a known time value to obtain a time of day for the next update of the metadata.

17. A mobile device configured to receive mobile broadcast services, comprising:
means for receiving mobile broadcast transmissions;
means for receiving a current metadata message from an overhead portion of the mobile broadcast transmissions, wherein the current metadata message contains information about upcoming broadcast content within a content flow portion of a mobile broadcast transmission;
means for obtaining information regarding a time for a next update of a metadata from the received current metadata message from the overhead portion of the mobile broadcast transmissions;
means for determining the time for the next update of the metadata from the information regarding the time for the next update of the metadata obtained from the received current metadata message;
means for de-energizing the means for receiving mobile broadcast transmissions;
means for determining if a current time equals the time for the next update of the metadata based on the information obtained from the received current metadata message from the overhead portion of the mobile broadcast transmissions;
means for energizing the means for receiving mobile broadcast transmissions when the current time equals the time for the next update of the metadata; and
means for receiving an updated metadata message from the overhead portion of the mobile broadcast transmissions, wherein the updated metadata message contains updated information about upcoming broadcast content within a content flow portion of a mobile broadcast transmission.

18. The mobile device of claim 17, wherein:
the information regarding the time for the next update of the metadata comprises an absolute time value; and
means for determining the time for the next update of the metadata from the information regarding the time for the next update of the metadata obtained from the received current metadata message comprises means for interpreting the absolute time value as a time of day at which to energize a transceiver.

19. The mobile device of claim 17, wherein:
the information regarding the time for the next update of the metadata comprises a relative time value; and
means for determining the time for the next update of the metadata from the information regarding the time for the next update of the metadata obtained from the received current metadata message comprises means for adding the relative time value to a known time value to obtain a time of day for the next update of the metadata.

20. A server within a mobile TV broadcast system, the server comprising:
means for determining a time for a next update of metadata containing information about upcoming broadcast content within a content flow portion of a mobile broadcast transmission;
means for including information regarding the determined time for the next update of the metadata within a current metadata message within an overhead portion of a first mobile broadcast transmission; and means for broadcasting an updated metadata message within an overhead portion of a subsequent mobile broadcast transmission when a current time equals the determined time for the next update of the metadata based on the information included within the current metadata message within the overhead portion of the first mobile broadcast transmission.

21. The server of claim 20, wherein the information regarding the time for the next update of the metadata comprises an absolute time value.

22. The server of claim 20, wherein the information regarding the time for the next update of the metadata comprises a relative time value.

23. A non-transitory computer-readable storage medium having stored thereon processor-executable instructions configured to cause a server processor to perform operations comprising:

determining a time for a next update of metadata containing information about upcoming broadcast content within a content flow portion of a mobile broadcast transmission;

including information regarding the determined time for the next update of the metadata within a current metadata message within an overhead portion of a first mobile broadcast transmission; and broadcasting an updated metadata message within an overhead portion of a subsequent mobile broadcast transmission when a current time equals the determined time for the next update of the metadata based on the information included within the current metadata message within the overhead portion of the first mobile broadcast transmission.

24. The non-transitory computer-readable storage medium of claim 23, wherein the stored processor-executable instructions are configured to cause the server processor to perform operations such that the information regarding the time for the next update of the metadata comprises an absolute time value.

25. The non-transitory computer-readable storage medium of claim 23, wherein the stored processor-executable instructions are configured to cause the server processor to perform operations such that the information regarding the time for the next update of the metadata comprises a relative time value.

26. A non-transitory computer-readable storage medium having stored thereon processor-executable instructions configured to cause a processor of a mobile device to perform operations comprising:

receiving mobile broadcast transmissions;

receiving a current metadata message from an overhead portion of the mobile broadcast transmissions, wherein the current metadata message contains information about upcoming broadcast content within a content flow portion of a mobile broadcast transmission;

obtaining information regarding a time for a next update of a metadata from the received current metadata message from the overhead portion of the mobile broadcast transmissions;

determining the time for the next update of the metadata from the information regarding the time for the next update of the metadata obtained from the received current metadata message;

de-energizing a means for receiving mobile broadcast transmissions;

determining if a current time equals the time for the next update of the metadata based on the information obtained from the received current metadata message from the overhead portion of the mobile broadcast transmissions;

energizing the means for receiving mobile broadcast transmissions when the current time equals the time for the next update of the metadata; and receiving an updated metadata message from the overhead portion of the mobile broadcast transmissions, wherein the updated metadata message contains updated information about upcoming broadcast content within a content flow portion of a mobile broadcast transmission.

27. The non-transitory computer-readable storage medium of claim 26, wherein the stored processor-executable instructions are configured to cause the processor to perform operations such that:

the information regarding the time for the next update of the metadata comprises an absolute time value, and the stored processor-executable instructions are configured to cause the processor to perform operations further comprising determining the time for the next update of the metadata from the information regarding the time for the next update of the metadata obtained from the received current metadata message comprises at least one instruction for interpreting the absolute time value as a time of day.

28. The non-transitory computer-readable storage medium of claim 26, wherein the stored processor-executable instructions are configured to cause the processor to perform operations such that:

the information regarding the time for the next update of the metadata comprises a relative time value, and the stored processor-executable instructions are configured to cause the processor to perform operations further comprising determining the time for the next update of the metadata from the information regarding the time for the next update of the metadata obtained from the received current metadata message comprises adding the relative time value to a known time value to obtain a time of day for the next update of the metadata.

* * * * *